United States Patent [19]
Markley

[11] 3,788,482
[45] Jan. 29, 1974

[54] FOLDED MEMBRANE DIALYZER

[75] Inventor: Finley W. Markley, Naperville, Ill.

[73] Assignee: The United States of America as represented by the United States Atomic Energy Commission, Washington, D.C.

[22] Filed: Mar. 10, 1972

[21] Appl. No.: 233,528

[52] U.S. Cl................................. 210/321, 210/493
[51] Int. Cl............................................ B01d 31/00
[58] Field of Search...... 210/321, 493; 264/257, 286

[56] References Cited
UNITED STATES PATENTS
3,612,281  10/1971  Leohard............................. 210/321
3,522,885  8/1970  Lavehoer et al.................... 210/321

*Primary Examiner*—Frank A. Spear, Jr.
*Attorney, Agent, or Firm*—Roland A. Anderson; John A. Horan; Robert James Fisher

[57] ABSTRACT

The present invention relates to an apparatus for the dialysis of two fluids and the method of making the same and is directed particularly to an apparatus for the dialysis of blood. The present invention uses a semipermeable membrane in sheet form, the membrane being folded into a large number of very closely spaced pleats. Support members are contained in all the pleats on one side of the membrane, all of the edges of which are sealingly embedded in a plastic material constituting at least a portion of the housing to give separate fluid chambers on the two sides of the membrane. A first fluid passes through the first such chamber within the pleats in a direction generally parallel to the creases of the pleats while a second fluid flows through the second chamber on the opposite side of the membrane pleats in a direction countercurrent to the first fluid. The apparatus is constructed either by placing the assembled folded membrane in a preconstructed rectangular casing and injecting a plastic material so as to surround and embed the edges of the membrane in the plastic material, or by placing the assembled folded membrane in a mold to form the housing by injecting a plastic material into the mold so as to surround and embed the edges of the membrane in the plastic material.

13 Claims, 5 Drawing Figures

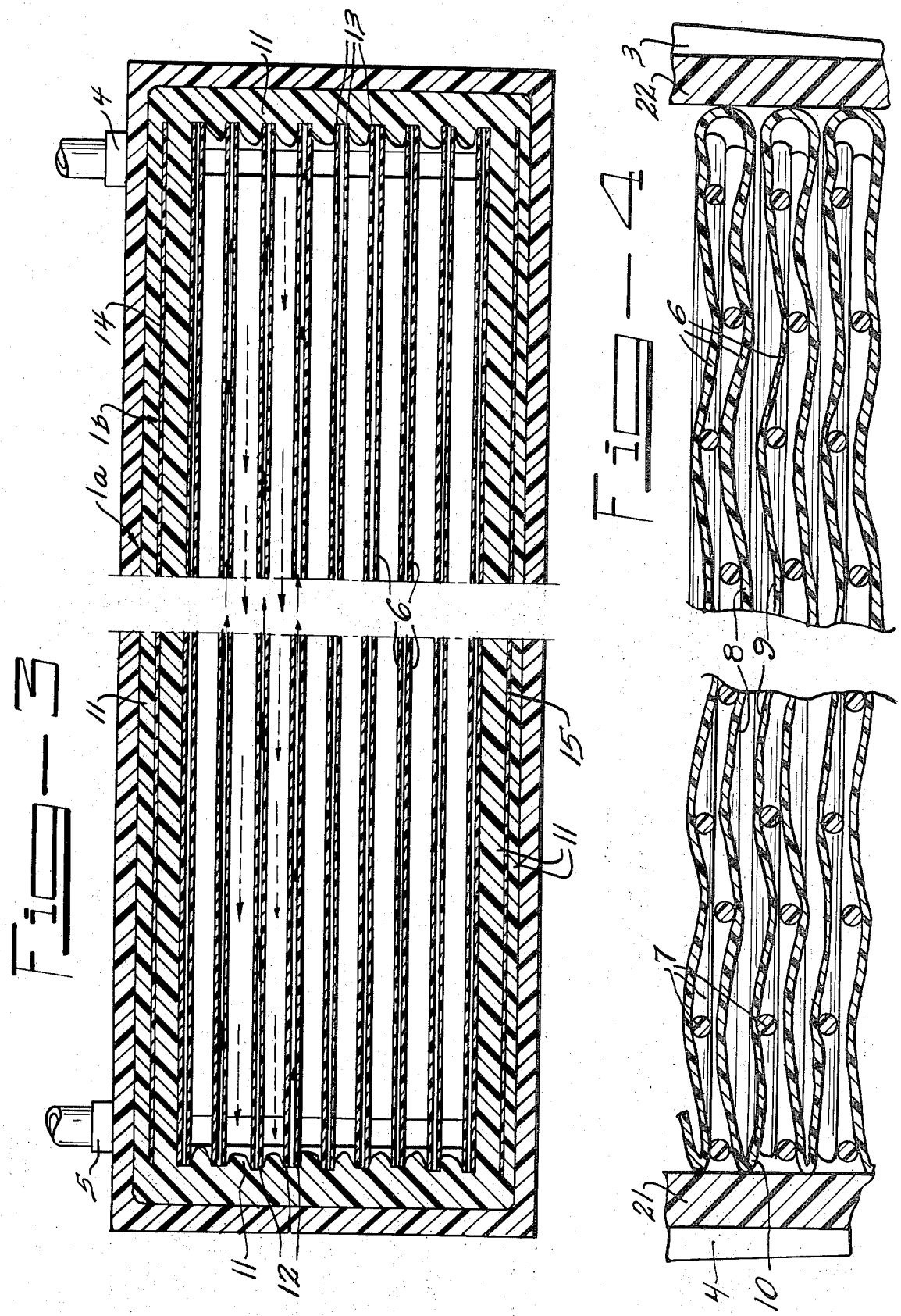

3,788,482

FOLDED MEMBRANE DIALYZER

CONTRACTUAL ORIGIN OF THE INVENTION

This invention was made in the course of, or under, a contract with the UNITED STATES ATOMIC ENERGY COMMISSION.

BACKGROUND OF THE INVENTION

This invention relates to an apparatus for use in the dialysis of two fluids and more particularly relates to an apparatus for the cleansing of impurities from blood by hemodialysis.

The treatment of patients, numbering well into the thousands throughout this country and around the world, who suffer from chronic kidney failure, is a serious problem for which no completely satisfactory solution has yet been found. While kidney transplants may offer a partial solution, transplanting of organs presents other characteristic problems and is far from a completely satisfactory solution. The alternative to kidney transplants is the "artificial kidney" or hemodialyzer. Although hemodialyzers have been used for many years and have provided successsful treatment for large numbers of kidney patients, presently available hemodialysis treatment, like kidney transplantation, does not give a completely satisfactory solution to the problem of kidney malfunction, and in fact the majority of people presently suffering from kidney malfunction do not receive any such treatment. Although there may be many possible reasons for this, two very predominant reasons are the lack of adequate numbers of hemodialyzer units and facilities for the vast number of people in need of treatment and the prohibitive costs of such treatment. Although the presently available and used hemodialyzers have proven successful for those who have obtained treatment with the units, the number available is drastically limited in relation to the numbers needed and, in addition, these hemodialyzers are expensive not only in the initial investment in the unit itself but in the costs of continuing hemodialysis treatment as well. Hemodialysis treatment is generally received in a hospital with appropriate facilities on an out-patient basis, the patient visiting the hospital two or three times a week for treatment. Treatment is given in the presence of trained medical personnel and a blood transfusion is often required to replace blood lost to the blood priming volume of the hemodialyzer unit. Although the expense of continuing treatment can be greatly reduced by having the patient or his family conduct the treatment in the home, presently available hemodialyzers and the associated equipment and safety circuits are very complicated and quite sophisticated so that the majority of kidney patients and their families are not capable of learning how to operate such complex equipment. Of the two most commonly used hemodialyzers, the Kiil dialyzer and the Kolff coil dialyzer, the Kolff coil dialyzer requires a blood pump and associated machinery, while the Kiil dialyzer, although eliminating the need of a blood pump, requires rebuilding of the unit under sterile conditions following each treatment. In either case, each treatment takes six to fourteen hours and is given two or three times a week. Unfortunately, in the period between treatments, poisons build up in the patient's blood so that by the end of the three to four day interim period the patient is apt to be quite ill. When the patient does receive treatment, these poisons are removed from the blood very rapidly so that an imbalance between the blood and the body cells is created which may be so great that the body chemistry is thrown out of balance and the patient becomes physically sick during treatment.

Hemodialyzers are presently being developed which will help solve some of these problems. Hemodialyzers such as those coinvented by the present inventor and forming the subject matter of U. S. Pat. No. 3,522,885 and U. S. Pat. No. 3,565,258 are sufficiently small that they can be operated without the need of an external blood pump. They are also constructed of inexpensive materials so that not only can they be produced relatively inexpensively and in large numbers, but they are disposable, each hemodialyzer unit being discarded after use. However, these hemodialyzers do not offer solutions to many of the present problems and, in addition to offering only partially satisfactory solutions to others, have some drawbacks of their own, such as requiring tubular regenerated cellulose for construction.

Hemodialyzers have also been designed which do not require tubular membranes, but instead use a sheet of semipermeable membrane. The majority of these hemodialyzers have rigid frames surrounding the effective dialysis surface area and support members which have elaborately designed connected channels for fluid flow. Generally these support members must align exactly to properly form the fluid channels. Such a hemodialyzer is subject of U. S. Pat. No. 3,396,849. A hemodialyzer which is described in U. S. Pat. No. 3,442,388, issued to David B. Pall, has eliminated the need for elaborately designed support members. This dialyzer has a membrane which has been folded into a multiple number of corrugations adhesively sealed between the two halves of a plastic housing and provides for passing the two fluids through the unit along the length of the corrugations on opposite sides of the membrane. The support member lies on one side of the membrane and follows the shape of the corrugated membrane. A leak-tight adhesive seal is effected between the housing and the membrane along the entire length of all the edges of the membrane. Since two of the edges of the membrane undulate back and forth forming the corrugations, they cannot be merely clamped between two straight edges of the housing halves as is done with the remaining two straight edges of the membrane, but instead an adhesive material is deposited between the ends of the housing and the undulating edges of the membrane along their entire length to form this leak-tight adhesive seal. Since the adhesive material necessarily will come into contact with the patient's blood, the adhesive must be inert with respect to the blood, neither reacting with any components in the blood nor releasing any poisons to the blood. Therefore, in selecting an appropriate adhesive for use in this dialyzer, not only must consideration be given to the nature of the material forming the housing and the membrane so that the adhesive bonds them together, but the adhesive must be inert with respect to the blood and must not react with the other materials to produce any substance which is not inert. While present hemodialyzers use regenerated cellulose for the semipermeable membrane and acceptable adhesives are known for use with the common housing materials, research is being conducted to develop other dialysis membrane materials which will be more efficient than regenerated cellulose.

Since presently used adhesives may not be acceptable for use with these new membranes, new acceptable adhesives would also have to be found for each new membrane.

The dialyzer of the present invention eliminates the problem of finding an acceptable adhesive for each new type of dialysis membrane material which may be developed as it is easily able to incorporate any dialysis membrane material and also eliminates the difficult problem of adhesively sealing the edges of the membrane along their entire length. The dialyzer of the present invention can be easily constructed from relatively inexpensive materials and is of a design which is readily adaptable to mechanized production methods. It is intended that a dialyzer according to the present invention be used frequently for short periods of time and that the unit be discarded after use. The design is sufficiently small that it is intended to eliminate the need of a blood pump and is sufficiently simple to do away with much of the complex associated equipment and safety circuits. The dialyzer of the present invention is designed to be used by the patient in his home under a program of daily dialysis for a period of one to two hours. Such a daily dialysis program will eliminate the large buildup of poisons in the blood so that the patient will not only feel better while undergoing treatment as well as be more alert and hence able to conduct the treatment himself, but the more frequent removal of poisons from the blood and the shorter lengths of time undergoing treatment will enable the patient to lead a more normal life.

SUMMARY OF THE INVENTION

In accordance with the present invention, a dialyzer is provided which employs a semipermeable membrane in sheet form but does not require an adhesive material to effect an adhesive seal between the membrane and the housing. Instead, the edges of the membrane are sealingly embedded in a plastic material which constitutes at least a portion of the housing. The semipermeable membrane is folded into a large number of very closely spaced pleats, support members being inserted into all those pleats on one side of the membrane while no supports are placed in the pleats on the opposite side of the membrane. The membrane assemblage is disposed within the housing so that the membrane undulates back and forth across the width of the housing. One embodiment employs a preconstructed casing with the two side walls of the casing fitting snugly against the pleats in the assemblage and each of the two side walls being provided at each end with access ports to the interior of the housing. A plastic material within the preconstructed casing constitutes a portion of the housing and surrounds the edges of the membrane sealingly embedding these edges so as to form a separate fluid chamber on each side of the membrane. Alternatively, no preconstructed casing is used but instead a housing is formed in place about the membrane assemblage. The housing is formed by surrounding the membrane assemblage with a plastic material which constitutes the entire housing and which also surrounds the edges of the membrane and sealingly embeds these edges so as to form separate fluid chambers on each side of the membrane which undulates back and forth across the width of the housing. Access ports are sealingly mounted on the housing over openings to the interior of the housing which were created by the removal of studs which were appropriately positioned against the membrane assemblage as it was surrounded by the plastic material. In each embodiment, the access ports provide means for passing one fluid through one of the separate fluid chambers in a direction generally parallel to the creases of the pleats and a second fluid through the other fluid chamber on the opposite side of the membrane countercurrent to the first fluid.

BRIEF DESCRIPTION OF THE DRAWINGS

A better understanding of the features of the present invention and the inherent advantages can be obtained from a reading of the following description of the invention and reference to the drawings, in which:

FIG. 3 is a transverse sectional view taken along the line 3—3 of FIG. 2.

FIG. 4 is a greatly enlarged view of a portion of FIG. 2 to show the detailed structure of the unit more clearly.

DESCRIPTION OF THE INVENTION

Figure 1:
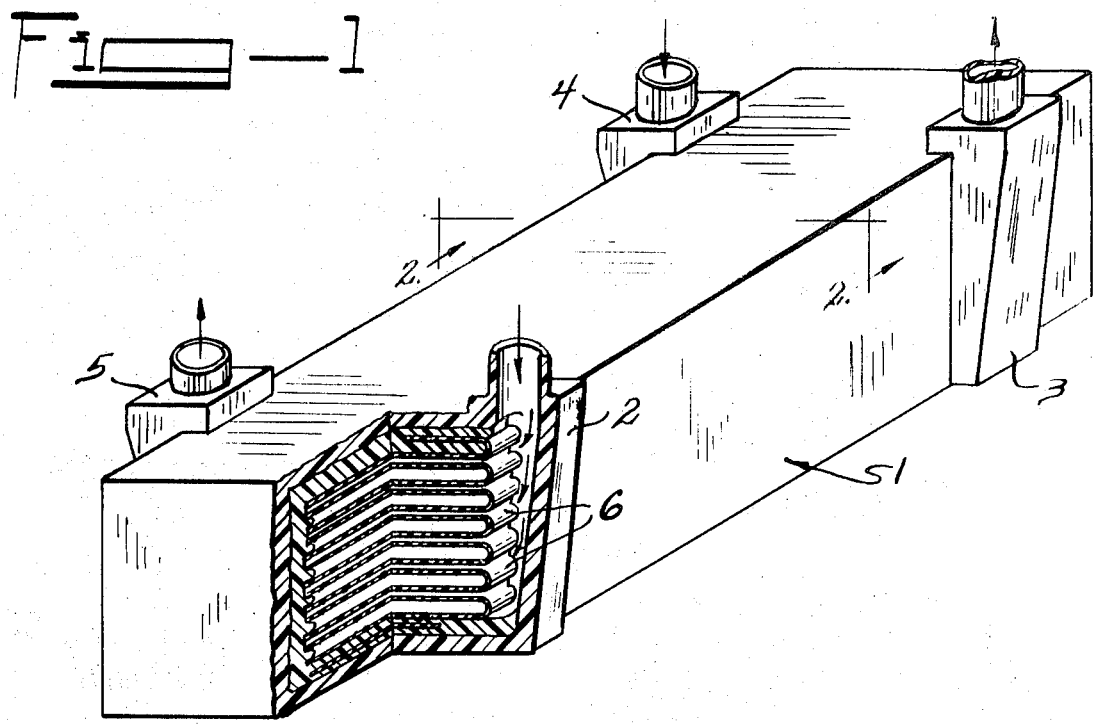
FIG. 1 is an isometric view of a dialyzer constructed in accordance with the present invention which is partially broken away to expose the interior structure of the dialyzer.
Figure 2:
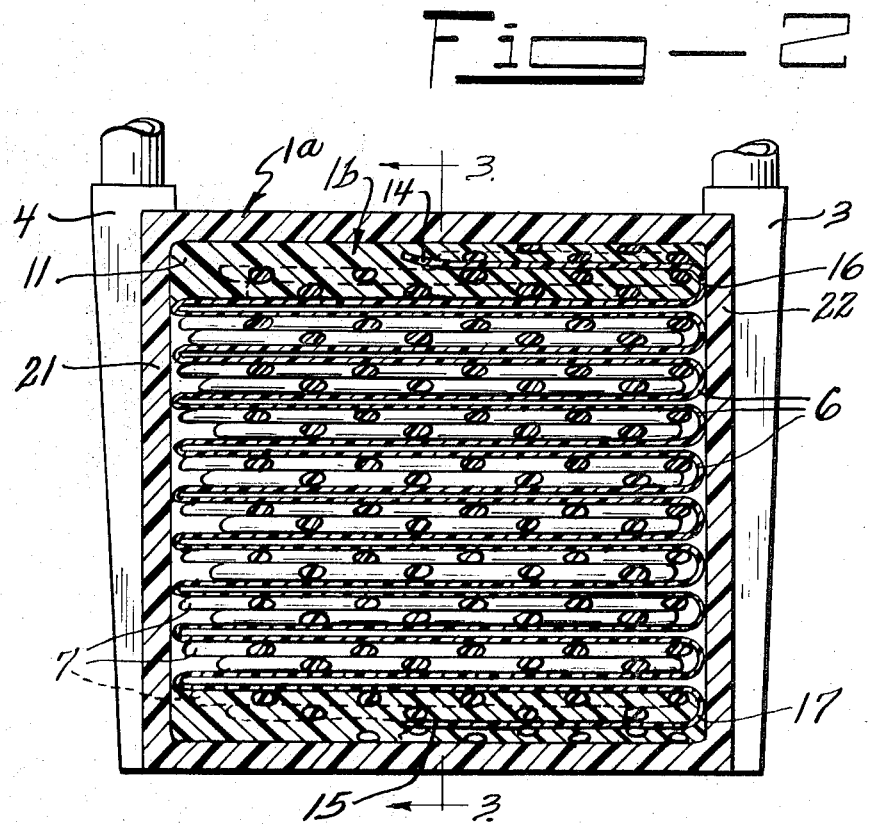
FIG. 2 is a sectional view taken along the line 2—2 of FIG. 1.

The construction and operation of the present invention can be best understood by referring first to FIG. 1 wherein there is shown a dialyzer unit in accordance with the present invention with one corner broken away to expose the interior structure. There is shown a rectangular housing indicated generally at 1 which has on one side thereof near one end a blood inlet port 2 and on the same side near the opposite end thereof a blood outlet port 3. The rectangular housing 1 also has on the opposite side thereof a dialysate inlet port 4 located near the same end as the blood outlet port 3 and a dialysate outlet port 5 located near the opposite end at the same end of the housing 1 as blood inlet port 2. A semipermeable membrane 6 is disposed within the housing 1. Referring to FIG. 2 and FIG. 3, membrane 6 is folded into a very large number of very closely spaced pleats which extend along the length of the housing and, as is most clearly seen in FIG. 2, undulates back and forth across the width of the housing 1. Support members 7 are disposed within all those pleats which are on one side of the membrane 6, while those pleats on the opposite side of membrane 6 do not contain support members, the support members 7 being disposed in those pleats on the side of the membrane 6 which communicates with the dialysate inlet port 4 and dialysate outlet port 5. For sake of clarity in the drawings, these support members 7 have not been included in FIG. 3. While it is permissible to have support members in all pleats on both sides of the membrane, it is preferred that there be support members on only one side. The support members 7 serve to hold the interior walls of the supported pleats apart, thereby retaining the supported pleats open for dialysate flow. While other types of support members can be used, it has been found that a nonwoven plastic mesh support is particularly useful and is preferred. The interior walls of the unsupported pleats, those pleats not containing support members, are essentially in contact over the larger part of their surface in the absence of a fluid and, therefore, in the absence of a fluid these unsupported pleats are essentially closed. While in the drawings a space has been left between the two interior walls of the unsupported pleats for sake of clarity, it should be understood that in fact these surfaces are essentially in contact and the unsupported pleats are normally closed. These unsupported pleats are capable of opening under a fluid pressure so that when blood is introduced into the dialyzer through blood inlet port 2, it will flow into the unsupported pleats and open them to permit blood flow therein. The blood flowing within the dialyzer is maintained at a pressure slightly greater than the pressure of the dialysate in order to drive water from the blood to the dialysate across the membrane, as it is a normal kidney function to remove excess water from the blood, and this greater pressure of the blood causes the separation of the normally closed unsupported pleats, thereby opening passages for the blood flow. The manner in which this is accomplished can be more easily understood by turning to FIG. 4 where a portion of the dialyzer has been greatly enlarged to show the relation of the membrane 6 and the support members 7 when the fluids are introduced into the dialyzer. Since the blood is at this slightly higher pressure, the membrane 6 distends into the spaces in the mesh supports 7, thereby opening the closed unsupported pleats and providing passages for blood flow through the dialyzer. The two interior walls, upper wall 8 and lower wall 9, of normally closed pleat 10 are generally in contact over the larger part of their surfaces. When blood is introduced, however, the membrane 6 distends into the support members 7, upper interior wall 8 distending upward toward the support member 7 on the opposite side of the membrane 6 above pleat 10, while the lower interior wall 9 distends downward toward the support member 7 beneath the pleat 10, this separation of the interior walls 8 and 9 opening pleat 10 for blood flow. Fluid flow through the dialyzer can be understood by referring to FIG. 1 and FIG. 3 wherein blood flow is represented by solid arrows and dialysate flow is represented by broken arrows. Blood enters the dialyzer through blood inlet port 2 and distributes across the width of the unsupported pleats opening them for flow as above described. The blood then flows within the unsupported pleats in a direction generally parallel to the creases of the pleats along the length of housing 1 toward the opposite end where it exits from the dialyzer through blood outlet port 3. Dialysate enters the dialyzer through dialysate inlet port 4 and distributes across the width of the supported pleats. Dialysate flows within the supported pleats on the opposite side of membrane 6 from the blood in a direction generally parallel to the creases and countercurrent to the blood flow. Dialysate flows along the length of the housing 1 toward dialysate outlet port 5 through which it exits from the dialyzer.

In one embodiment of the present invention, which embodiment is illustrated in FIGS. 2 - 4, the housing 1 comprises an outer portion 1a and an inner portion 1b. Outer portion 1a is a preconstructed rectangular casing having on the opposite ends of each of the two side walls thereof a fluid inlet port and a fluid outlet port which provide access to the interior of the housing 1. Inner portion 1b consists of a plastic material 11 which surrounds all the edges of the membrane 6 sealingly embedding these edges so as to form separate fluid chambers on the opposite sides of membrane 6. One of these chambers is for dialysate flow and consists of the interiors of the supported pleats while the other chamber is for blood flow and consists of the interiors of the unsupported pleats. Flow through these chambers is as described above. The side-edges 12 and 13 of membrane 6, side-edges 12 and 13 being those edges of the membrane 6 which are perpendicular to the creases of the pleats and which undulate back and forth across the width of the housing 1, are surrounded by and sealingly embedded in plastic material 11 near the ends of housing 1, as is best seen in FIG. 3. Plastic material 11 extends a slight distance into the supported pleats so as to surround side-edges 12 and 13 and extends to the ends of the casing 1a so as to constitute a portion of the walls of housing 1. The end-edges 14 and 15 of membrane 6, end-edges 14 and 15 being those edges of the membrane 6 which are parallel to the creases of the pleats and which extend along the length of housing 1, are likewise surrounded by and sealingly embedded in plastic material 11 near the top and bottom of housing 1. As is apparent in FIG. 3, end-edges 14 and 15 are completely surrounded by plastic material 11 along their entire length along the top and bottom of housing 1. Referring to FIG. 2, it is seen that end-edge 14 forms one part of first pleat 16 while end-edge 15 forms one part of last pleat 17. First pleat 16 and last pleat 17 are filled with plastic material 11, thereby completely surrounding and embedding end-edges 14 and 15, plastic material 11 extending to the top and bottom of the casing 1a so as to again constitute a portion of housing 1. Since all the edges of membrane 6 are sealingly embedded in the plastic material 11, the chambers on the two sides of membrane 6 are separated from each other and intermingling of blood and dialysate is prevented.

In a preferred embodiment of the present invention, the first pleast 16 and the last pleat 17 open to the same side of housing 1 and are among those pleats which contain support members. These support members disposed in first pleat 16 and last pleat 17 can be considered as spacing members as they serve to hold pleats 16 and 17 open to permit plastic material 11 to fill these pleats, thereby surrouding end-edges 14 and 15. To further facilitate the introduction of plastic material 11 into the first and last pleats 16 and 17, these pleats extend only part way across the width of the housing, end-edge 14 and end-edge 15 which form a portion of first pleat 16 and last pleat 17, respectively, terminating at a line approximately one-half the distance across the width of the housing, as is depicted in FIG. 2. The plastic material 11 can then be readily introduced into pleats 16 and 17 around end-edges 14 and 15 which are near the midpoints of the top and bottom of the housing 1.

Figure 5:
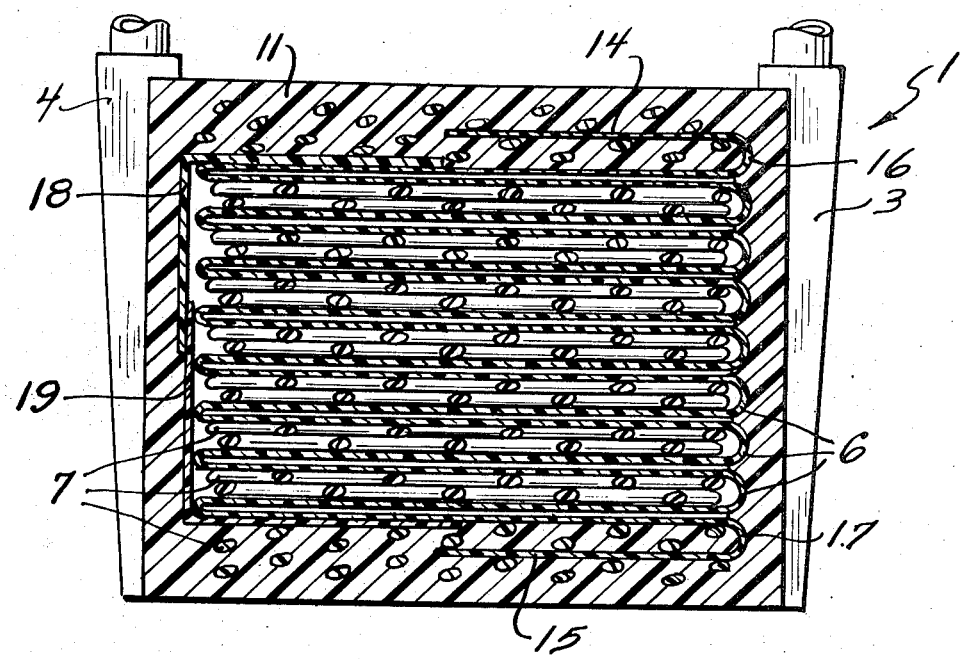
FIG. 5 is a sectional view of an alternative construction.

Referring to FIG. 2 and the embodiment in which a preconstructed rectangular casing 1a is used, it can be seen that the two side walls 21 and 22 of the casing 1a fit snugly against the undulating membrane 6. Since there is this snug fit between the membrane 6 and the side walls 21 and 22, plastic material 11 does not extend along the interior of the side walls. In an alternative embodiment of the present invention, which embodiment is illustrated in FIG. 5, plastic material 11 forms the entire housing 1 rather than constituting only a portion of it, no preconstructed casing being used. Consequently, in the alternative embodiment, a first barrier sheet 18 and a second barrier sheet 19 overlap and cover the openings to the supported pleats which face the side of the housing, these barrier sheets preventing plastic material 11, which surrounds and sealingly embeds all the edges of membrane 6 as described above, from filling any of that portion of the opened supported pleats. Barrier sheets 18 and 19 essentially lie between the supported pleats and the interior side wall of housing 1 and lie along the length of the housing 1 between dialysate inlet 4 and dialysate outlet 5. First barrier sheet 18 has one edge extending into the first pleat 16 between the contained support member 7 and the lower interior wall of pleat 16 which also forms a portion of the adjacent pleat, and extends across the membrane pleats towards the last pleat 17. Second barrier sheet 19 has one edge extending into the last pleat 17 between the contained support member 7 and the upper interior wall of pleat 17 which also forms a portion of the adjacent pleat, and extends across the membrane pleats towards the first pleat 16, overlapping with barrier sheet 18. While these barrier sheets can be chosen from a wide variety of materials, thin sheets of polycarbonate and polypropylene have been found to be very satisfactory.

The use of barrier sheets on the dialysate side of the membrane pleats in the alternative embodiment is dictated by the method of making the particular embodiment. In constructing either embodiment of the present invention, the semipermeable dialysis membrane is folded into a large number of very closely spaced pleats of the desired width. In the preferred embodiments, the membrane is folded into an odd number of pleats so that the first and last pleat open to the same side of the membrane and is further folded such that the end-edges of the membrane terminate at a line approximately one-half the distance across the width of the other pleats. Support members, preferably plastic nonwoven mesh supports, are inserted into all pleats on one side of the membrane, this being the same side of the membrane as the first and last pleats in the preferred embodiment. Spacing members are inserted into both the first pleat and the last pleat to maintain these pleats substantially opened, the support member serving as the spacing member in the preferred embodiment. The spacing members can be of any shape or structure which will maintain space between two abutting surfaces while permitting a fluid plastic material to flow around and through the member. The above-described nonwoven mesh support members serve well as spacing members. Other spacing members are placed on the outside of the first and last pleat so as to encompass the two end-edges of the membrane between spacing members. If barrier sheets are to be used, they are inserted into the first and last pleats between the contained support member and the adjacent pleat of the membrane and extend over the openings in the supported pleats so as to overlap and cover these openings. They further extend along the length of the pleats between the openings to the interior of the pleats associated with the inlet and outlet ports. When a pre-constructed rectangular plastic casing is used, these barrier sheets are not essential, although they can still be used with no ill effects. Instead, the above membrane assemblage, comprising the folded membrane, the support members, the spacing members and optionally the barrier sheets, is placed in the rectangular casing so that the two end-edges of the membrane are adjacent the top and bottom of the casing, the membrane consequently undulating across its width. The casing is of such dimensions that the top, bottom, and two side walls fit snugly against the membrane assemblage, the side walls fitting very snugly so as to function similarly to the barrier sheets in preventing flow of plastic material into the supported pleats, while a narrow gap is left between the side-edges of the membrane which form the ends of the assemblage and the ends of the casing. Both of the side walls of the casing have an inlet port at one end and an outlet port near the opposite end, these ports being of identical structure and labeled inlet or outlet only for sake of convenience. A fluid plastic material is injected into the casing through the top, bottom, and each of the two ends of the casing. The plastic material flows along the top and bottom walls of the casing around and through the spacing members and around the end-edges of the membrane to fill the first and last pleats, thereby completely surrounding the end-edges of the membrane. The plastic material can more readily flow around the end-edges of the membrane to fill the first and last pleats when the end-edges terminate one-half the distance across the width of the casing as in the preferred embodiment. The fluid plastic material also fills the narrow space between the side-edges of the membrane and the end walls of the casing and flows a short distance into the supported pleats which are slightly opened by the support members. The two side-edges of the membrane are thereby surrounded by the plastic material as well as the two end-edges. The viscosity of the fluid plastic material is adjusted so as to control its flow characteristics, it being desirable to have it sufficiently thin to flow so as to surround the edges of the membrane but sufficiently viscous that it can flow only a short distance into the pleats, as flow into the pleats would reduce the membrane area available for dialysis. The plastic material does not flow into the unsupported pleats as their interior walls are essentially in contact over their entire surface until a fluid is introduced, the unsupported pleats being essentially closed. The viscosity of the plastic material is also such that the snug fit between the side walls of the casing and the membrane assemblage prevents flow along the side walls. The fluid plastic material is subsequently solidified whereby, having filled the space along the interior walls of the casing, it constitutes a portion of the housing. The edges of the membrane are thereby sealingly embedded in the plastic material, thereby dividing the dialyzer into two separate chambers on the two opposite sides of the membrane. Since the edges are embedded, an adhesive seal between the plastic material and the membrane is not necessary, and although the plastic material can be an adhesive it need not be one but can be chosen from a wide variety of materials inert to the blood which can be injected as a plastic capable of flowing and subsequently solidified. The plastic material must remain solid at room temperature and slightly above after solidifying, the solidification being effected in any of a variety of ways dependent upon the material, such as cooling below a melting point, heat curing, chemical curing, etc. Examples of substances which can be used as the plastic material are polyethylene, polypropylene, polycarbonate, epoxy resins, polyester resins, polystyrene, etc.

A particular example of a plastic material formulation which has been used successfully is 100 parts of EPON 828, a diglycidal ether of bisphenyl A epoxy resin produced by Shell Chemical Company, 10 parts of triethylenetetraamine which acts as a curing agent, and 10–12 parts of a thickening agent Cab-O-Sil which is a silica aerogel produced by Cabot Corporation. While the above formulation has good adhesive characteristics, it is not necessary that the plastic material be a good adhesive and in fact another formulation which has poor adhesive characteristics but has also been used successfully is 100 parts of EPON 828, 24 parts of Cab-O-Sil, and 100 parts of Versamid 140 which is the reaction product of an excess of a polyfunctional amine and a poly-functional fatty acid and is produced by General Mills.

An alternative method of making the dialyzer of the present invention does not incorporate a preconstructed rectangular casing but instead the housing is formed about the membrane assemblage. The above-described membrane assemblage is placed into a rectangular mold rather than a preconstructed casing and the housing is formed about the membrane assemblage within the mold. The mold is of such dimensions that the spacing members surrounding the membrane are held between the top and bottom of the mold while a narrow gap is left between the membrane assemblage and the side and end walls of the mold. Studs, either integral with the mold or placed therein, occupy the narrow gap between the membrane assemblage and the side wall of the mold near each end of each side wall. These studs extend vertically from the first pleat to the last pleat and fit snugly against the membrane assemblage so as to prevent plastic material from sealing off the entire side of the membrane assemblage, the openings left by the studs serving as access ports to the dialyzer interior. The plastic material is then injected into the mold and solidified. The plastic material surrounds and sealingly embeds all edges of the membrane as described above and also fills the gaps on the sides and ends of the mold and within the spacing members to form the plastic housing about the embedded membrane. The barrier sheets, if used, prevent any plastic material from entering the opened pleats which may happen to a small degree if no barrier sheets are used. After the housing is removed from the mold, the studs are removed, exposing openings to the two interior chambers on the two sides of the membrane. Inlet and outlet ports are sealingly mounted on the housing over these openings to complete construction of the dialyzer. Alternatively, inlet and outlet ports can be placed in the mold in place of the studs and molded into place or the ports can be formed in the mold with the housing by an appropriately constructed mold.

In the embodiments of the present invention and by each of the disclosed methods of making the dialyzer, the edges of the membrane are surrounded by and sealingly embedded in a plastic material which constitutes a portion of or forms the entire housing. Since the edges are sealingly embedded, the need of an adhesive material to effect an adhesive bond between the membrane and the housing has been eliminated. This permits a wider variety of dialysis membranes to be used and new dialysis membranes can be employed without the need of developing or finding a new compatible adhesive bonding agent. The use of sheet form rather than tubular form membrane increases the potential use of the design, as many dialysis membrane materials cannot be made in tubular form, as well as lowers the cost of construction, as sheet membrane is generally less expensive than tubular forms. The costs of construction of the dialyzer of the present invention are relatively low, since inexpensive materials can be used and the methods of construction are adaptable to more mechanized techniques. The dialyzer is sufficiently small that a blood pump is not necessary, and it is intended to produce the disposable dialyzers at a sufficiently low cost and in sufficient numbers to permit daily dialysis for short times in the home without the presence of trained medical personnel.

While the present invention has been described as a hemodialyzer with frequent references to dialysate fluid and blood, the invention is not so limited but is equally adaptable to other forms of dialysis and has been described as a hemodialyzer solely for sake of convenience. It will be understood that the invention is not limited to the details given herein but that it may be modified within the scope of the appended claims.

The embodiments of the invention in which an exclusive property or privilege is claimed are defined as follows:

1. A dialyzer comprising: a rectangular housing; a semipermeable membrane disposed within said housing, said membrane being folded into a large number of very closely spaced pleats so as to undulate across the width of said housing, all edges of said membrane being embedded in a nonadhesive plastic material selected from the group consisting of polycarbonate, polypropylene, polyethylene, and polystyrene, said nonadhesive plastic material constituting at least a portion of said housing to form thereby a first fluid chamber on one side of said membrane sealingly separated from a second fluid chamber on the opposite side of said membrane; support members disposed within all pleats on one side only of said membrane; means for passing a first fluid through said first chamber in a direction generally parallel to the creases of said pleats; and means for passing a second fluid through said second chamber countercurrent to the first fluid.

2. A dialyzer in accordance with claim 1 wherein said plastic material fills the space along the interior walls of a preconstructed rectangular casing so as to constitute a portion of said housing and so as to surround the edges of said membrane.

3. The dialyzer according to claim 2 wherein the first pleat and the last pleat in said semipermeable membrane open to the same side of said housing and the support members are disposed in said first pleat, said last pleat, and all other pleats on the same side of said membrane.

4. The dialyzer according to claim 3 wherein the first pleat and the last pleat in said membrane extend only part way across the width of said housing, the end-edges of said membrane terminating at a line approximately one-half of the distance across the width of the housing, said plastic material filling said first pleat and said last pleat so as to completely surround said end-edges of said membrane.

5. A dialyzer in accordance with claim 2 wherein the semipermeable membrane is folded such that those pleats not containing support members therein are essentially closed in the absence of a fluid, the portions of the membrane surface forming the opposite interior walls of each of these pleats being essentially in contact, and opened in the presence of a fluid, these pleats being capable of opening under a fluid pressure which distends the membrane into the support members in the pleats on the opposite side of said membrane.

6. A dialyzer in accordance with claim 1 wherein: said plastic material constitutes the entire housing, surrounding the edges of the membrane and completely enclosing the entire undulating membrane so as to form a rectangular housing.

7. A dialyzer in accordance with claim 6 wherein the semipermeable membrane is folded such that those pleats not containing support members therein are essentially closed in the absence of a fluid, the portions of the membrane surface forming the opposite interior walls of each of these pleats being essentially in contact, and opened in the presence of a fluid, these unsupported pleats being capable of opening under a fluid pressure which distends the membrane into the support members disposed in the pleats on the opposite side of said membrane.

8. A dialyzer in accordance with claim 7 wherein the first pleat and the last pleat in said semipermeable membrane are on the same side of said membrane and the support members are disposed in said first and last pleats and the other pleats on the same side of the membrane; and wherein said dialyzer further comprises a first barrier sheet and a second barrier sheet disposed within said housing on the same side of the membrane as said support members and essentially lying between said supported pleats and the interior side wall of said housing, said first barrier sheet having one edge inserted into the first pleat between the contained support member and the adjacent pleat, said first barrier sheet extending over the membrane pleats towards said last pleat, said second barrier sheet having one edge inserted into the last pleat between the contained support member and the adjacent pleat, said second barrier sheet extending over the membrane pleats towards said first pleat so as to overlap said first barrier sheet, said two barrier sheets lying along the length of the side of the housing so as to cover the openings in the supported pleats parallel to the creases of the pleats and to prevent the plastic material from extending into said supported pleats.

9. A dialyzer according to claim 8 wherein the first pleat and the last pleat in said membrane extend only part way across the width of said housing, the end-edges of said membrane terminating at a line approximately one-half of the distance across the width of the housing, said plastic material filling said first pleat and said last pleat so as to completely surround said end-edges of said membrane.

10. A method of making the dialyzer of claim 2 comprising:
a. folding a semipermeable membrane into a large number of very closely spaced pleats;
b. inserting support members into all pleats on one side of said membrane;
c. inserting spacing members into both the first pleat and the last pleat to maintain said first and last pleats substantially opened;
d. placing spacing members on the outside of said first pleat and on the outside of said last pleat whereby each of the two end-edges of said membrane lie between spacing members on the outside of the pleat and a spacing member within the pleat;
e. placing the above membrane assemblage into a rectangular casing, said rectangular casing having on each of the two side walls thereof an inlet port near one end and an outlet port near the opposite end, said membrane assemblage being placed such that the two end-edges of the membrane and their associated spacing members are adjacent the top and bottom walls of said casing and said membrane assemblage fits snugly against the top, bottom, and two side walls of said casing while a narrow space is left between the side-edges of the membrane which form the ends of the assemblage and the end walls of the casing;
f. injecting into said casing through the top, bottom, and each of the two end walls, a fluid plastic material which flows along said top and bottom walls and fills said substantially opened first and last pleats, thereby completely surrounding said two end-edges of the membrane, and which fills said narrow spaces between said side-edges of the membrane and the end walls of the casing and which flows a short distance into the supported pleats which are held slightly opened by said support members, thereby surrounding said two side-edges of the membrane; and
g. solidifying said fluid plastic material whereby all edges of said membrane are embedded in said plastic material which forms a portion of the housing and said housing is divided into two sealingly separate fluid chambers on opposite sides of said membrane.

11. A method of making the dialyzer of claim 6 comprising:
a. folding the semipermeable membrane into a large number of very closely spaced pleats;
b. inserting support members into all pleats on one side of said membrane;
c. inserting spacing members into both the first pleat and the last pleat to maintain said first and last pleats substantially opened;
d. placing spacing members on the outside of said first pleat and on the outside of said last pleat whereby each of the two end-edges of said membrane lie between spacing members on the outside of the pleat and a spacing member within the pleat;
e. placing the above membrane assemblage into a rectangular mold of such internal dimensions that the support members about the end-edges of the membrane contact the top and bottom walls of said mold while a narrow gap is left between the membrane assemblage and the two side walls of the mold and between the side-edges of the membrane which form the ends of the assemblage and the two end walls of the mold;
f. placing studs in the narrow gap between said membrane assemblage and said mold near each end of each side wall thereof, said studs extending vertically from the first pleat to the last pleat and fitting snugly between the side walls of said mold and said membrane assemblage;
g. injecting into said mold a fluid plastic material, said fluid plastic material flowing into and filling said narrow gap between said membrane assemblage and said side walls of said mold between and about said studs, flowing into and filling said narrow gap between the side-edges of the membrane which form the ends of the assemblage and the end walls of said mold and further flowing form this gap a short distance into the supported pleats which are held slightly opened by said support members thereby surrounding said two side-edges of the membrane, and flowing into and about said spacing members and into and filling said substantially opened first and last pleats thereby completely surrounding said two end-edges of said membrane;

h. solidifying said fluid plastic material whereby all edges of said membrane are embedded in said plastic material and said plastic material forms a housing about said membrane assemblage, said housing having openings to its interior at the points of contact between said membrane assemblage and said studs;

i. removing said housing from said mold;

j. removing said studs from said housing to expose said openings to the interior; and k. sealingly mounting access ports on said housing over said openings.

12. A method according to claim 11 further comprising: prior to placing the membrane assemblage in the mold, placing a first and a second barrier sheet along the side of said membrane assemblage on the same side of said membrane as said support members, one edge of said first barrier sheet being inserted between the support member and a membrane wall of the first supported pleat, said first barrier sheet extending over the pleats towards the last pleat, one edge of said second barrier sheet being inserted between the support member and a membrane wall of the last supported pleat, said second barrier sheet extending over the pleats toward the first pleat so as to overlap with said first barrier sheet, said first and second barrier sheets being of such a length so as to extend along the length of the side of the assemblage between said studs.

13. A method according to claim 12 wherein said membrane is folded such that the first pleat and the last pleat extend only part way across the width of the other pleats, the end-edges of said membrane terminating at a line approximately one-half the distance across the width of the pleats, and the first and last pleats are on the same side of the membrane and have support members inserted therein.

* * * * *